United States Patent
Zhao et al.

(10) Patent No.: US 9,919,957 B2
(45) Date of Patent: Mar. 20, 2018

(54) INORGANIC FIBER

(71) Applicant: UNIFRAX I LLC, Tonawanda, NY (US)

(72) Inventors: Donghui Zhao, Amherst, NY (US); Bruce K. Zoitos, Williamsville, NY (US); Michael J. Andrejcak, Tonawanda, NY (US); Jason M. Hamilton, Lancaster, NY (US)

(73) Assignee: Unifrax I LLC, Tonawanda, NY (US)

(*) Notice: Subject to any disclaimer, the term of this patent is extended or adjusted under 35 U.S.C. 154(b) by 0 days.

(21) Appl. No.: 15/407,100

(22) Filed: Jan. 16, 2017

(65) Prior Publication Data

US 2017/0204537 A1 Jul. 20, 2017

Related U.S. Application Data

(60) Provisional application No. 62/280,155, filed on Jan. 19, 2016.

(51) Int. Cl.
*C03C 13/00* (2006.01)
*C03C 13/06* (2006.01)
*D01F 9/08* (2006.01)

(52) U.S. Cl.
CPC .............. *C03C 13/06* (2013.01); *C03C 13/00* (2013.01); *D01F 9/08* (2013.01); *D10B 2101/08* (2013.01)

(58) Field of Classification Search
CPC ........ C03C 13/00; C03C 13/06; C03C 13/006
See application file for complete search history.

(56) References Cited

U.S. PATENT DOCUMENTS

| | | |
|---|---|---|
| 1,759,919 A | 5/1930 | Singer |
| 2,051,279 A | 8/1936 | Thorndyke |
| 2,335,220 A | 11/1943 | Edwards |
| 2,576,312 A | 11/1951 | Minnick |
| 2,690,393 A | 9/1954 | McGarvey |
| 2,693,668 A | 11/1954 | Slayter |
| 2,699,415 A | 1/1955 | Nachtman |
| 2,710,261 A | 6/1955 | McMullen |
| 2,876,120 A | 3/1959 | Machlan |
| 2,877,124 A | 3/1959 | Welsh |
| 3,112,184 A | 11/1963 | Hollenbach |
| 3,166,428 A | 1/1965 | Thomas |
| 3,348,994 A | 10/1967 | Rees et al. |
| 3,380,818 A | 4/1968 | Smith |
| 3,383,275 A | 5/1968 | Croop et al. |
| 3,402,055 A | 9/1968 | Harris et al. |
| 3,455,731 A | 7/1969 | Nielsen et al. |
| 3,458,329 A | 7/1969 | Owens et al. |
| 3,459,568 A | 8/1969 | Rinehart |
| 3,469,729 A | 9/1969 | Grekila et al. |
| 3,597,179 A | 8/1971 | Simmons |
| 3,687,850 A | 8/1972 | Gagin |
| 3,783,092 A | 1/1974 | Majumdar |
| 3,785,836 A | 1/1974 | Bacon |
| 3,788,885 A | 1/1974 | Birchall et al. |
| 3,789,096 A | 1/1974 | Church et al. |
| 3,799,836 A | 3/1974 | Rogers et al. |
| 3,804,608 A | 4/1974 | Gaskell et al. |
| 3,804,646 A | 4/1974 | Dumbaugh, Jr. |
| 3,811,901 A | 5/1974 | Bacon |
| 3,854,986 A | 12/1974 | Chvalovsky et al. |
| 3,887,386 A | 6/1975 | Majumdar |
| 3,899,342 A | 8/1975 | Birchall et al. |
| 3,900,329 A | 8/1975 | Grubb et al. |
| 3,904,424 A | 9/1975 | Aoki et al. |
| 3,985,935 A | 10/1976 | Brodmann |
| 3,992,498 A | 11/1976 | Morton et al. |
| 4,002,482 A | 1/1977 | Coenen |
| 4,011,651 A | 3/1977 | Bradbury et al. |
| 4,036,654 A | 7/1977 | Yale et al. |
| 4,037,015 A | 7/1977 | Koike et al. |
| 4,078,939 A | 3/1978 | Schwochow |
| 4,102,892 A | 7/1978 | Schartau et al. |
| 4,104,355 A | 8/1978 | Dunn et al. |
| 4,118,239 A | 10/1978 | Gagin et al. |
| 4,194,914 A | 3/1980 | Moriya et al. |
| 4,243,421 A | 1/1981 | Kume |

(Continued)

FOREIGN PATENT DOCUMENTS

| | | |
|---|---|---|
| CA | 1 271 785 A | 7/1990 |
| CA | 2017344 | 11/1990 |
| CA | 2043699 | 12/1991 |
| EP | 0 074 655 A1 | 3/1983 |
| EP | 0132078 | 1/1985 |
| EP | 0 142 715 A2 | 5/1985 |
| EP | 0 146 398 A2 | 6/1985 |
| EP | 0 155 550 A1 | 9/1985 |
| EP | 0 178 688 A2 | 4/1986 |
| EP | 0 178 689 A2 | 4/1986 |
| EP | 0 186 128 A2 | 7/1986 |
| EP | 0 302 465 A2 | 2/1989 |
| EP | 0 417 493 A2 | 3/1991 |
| EP | 0 427 873 A1 | 5/1991 |

(Continued)

OTHER PUBLICATIONS

International Search Report for corresponding PCT/US2017/013932, dated May 1, 2017.

(Continued)

*Primary Examiner* — Elizabeth A. Bolden

(74) *Attorney, Agent, or Firm* — Curatolo Sidoti Co., LPA; Salvatore A. Sidoti; Floyd Trillis, III

(57) ABSTRACT

An inorganic fiber containing silica and magnesia as the major fiber components and which further includes an intended chromium oxide additive to improve the dimensional stability of the fiber. The inorganic fiber exhibits good thermal insulation performance at 1400° C. and greater, retains mechanical integrity after exposure to the use temperature, and which remains soluble in physiological fluids. Also provided are thermal insulation product forms that are made from a plurality of the inorganic fibers, methods of preparing the inorganic fiber, and methods of thermally insulating articles using thermal insulation prepared from a plurality of the inorganic fibers.

33 Claims, No Drawings

(56) References Cited

U.S. PATENT DOCUMENTS

| | | |
|---|---|---|
| 4,303,722 A | 12/1981 | Pilgrim |
| 4,312,911 A | 1/1982 | Smith et al. |
| 4,317,575 A | 3/1982 | Cavicchio et al. |
| 4,330,628 A | 5/1982 | Cockram et al. |
| 4,345,430 A | 8/1982 | Pallo et al. |
| 4,358,500 A | 11/1982 | George et al. |
| 4,363,878 A | 12/1982 | Yamamoto et al. |
| 4,366,251 A | 12/1982 | Rapp |
| 4,375,493 A | 3/1983 | George et al. |
| 4,379,111 A | 4/1983 | Smith et al. |
| 4,382,104 A | 5/1983 | Smith et al. |
| 4,387,180 A | 6/1983 | Jen et al. |
| 4,396,661 A | 8/1983 | George et al. |
| 4,412,911 A | 11/1983 | Schucker et al. |
| 4,428,999 A | 1/1984 | George et al. |
| 4,461,840 A | 7/1984 | Massol |
| 4,492,722 A | 1/1985 | Ritter, II et al. |
| 4,507,355 A | 3/1985 | George et al. |
| 4,542,106 A | 9/1985 | Sproull |
| 4,547,403 A | 10/1985 | Smith |
| 4,558,015 A | 12/1985 | Ekdahl et al. |
| 4,563,219 A | 1/1986 | George et al. |
| 4,604,097 A | 8/1986 | Graves et al. |
| 4,613,577 A | 9/1986 | Tagai et al. |
| 4,615,988 A | 10/1986 | Le Moigne et al. |
| 4,659,610 A | 4/1987 | George et al. |
| 4,668,590 A | 5/1987 | Yamamoto et al. |
| 4,673,594 A | 6/1987 | Smith |
| 4,687,749 A | 8/1987 | Beall |
| 4,735,857 A | 4/1988 | Tagai et al. |
| 4,737,192 A | 4/1988 | Smith |
| 4,778,499 A | 10/1988 | Beaver |
| 4,820,573 A | 4/1989 | Tagai et al. |
| 4,830,989 A | 5/1989 | Trivedi et al. |
| 4,867,779 A | 9/1989 | Meunier et al. |
| 4,882,302 A | 11/1989 | Horiuchi et al. |
| 4,933,307 A | 6/1990 | Marshall et al. |
| 5,037,470 A | 8/1991 | Matzen et al. |
| 5,055,428 A | 10/1991 | Porter |
| 5,064,785 A | 11/1991 | Kawamoto et al. |
| 5,108,957 A | 4/1992 | Cohen et al. |
| 5,145,734 A | 9/1992 | Ito et al. |
| 5,221,558 A | 6/1993 | Sonuparlak et al. |
| 5,223,336 A | 6/1993 | Griffith et al. |
| 5,250,488 A | 10/1993 | Thelohan et al. |
| 5,284,807 A | 2/1994 | Komori et al. |
| 5,312,806 A | 5/1994 | Mogensen |
| 5,332,699 A | 7/1994 | Olds et al. |
| 5,346,575 A | 9/1994 | Griffith et al. |
| 5,346,868 A | 9/1994 | Eschner |
| 5,371,050 A | 12/1994 | Belitskus et al. |
| 5,384,188 A | 1/1995 | Lebold et al. |
| 5,389,716 A | 2/1995 | Graves |
| 5,401,693 A | 3/1995 | Bauer et al. |
| 5,420,087 A | 5/1995 | Wieland et al. |
| 5,480,676 A | 1/1996 | Sonuparlak et al. |
| 5,486,232 A | 1/1996 | Griffith et al. |
| 5,552,213 A | 9/1996 | Eschner |
| 5,569,629 A | 10/1996 | Teneyck et al. |
| 5,576,252 A | 11/1996 | Rapp et al. |
| 5,580,532 A | 12/1996 | Robinson et al. |
| 5,583,080 A | 12/1996 | Guldberg et al. |
| 5,585,312 A | 12/1996 | Teneyck et al. |
| 5,591,516 A | 1/1997 | Jaco et al. |
| 5,603,887 A | 2/1997 | Eschner |
| RE35,557 E | 7/1997 | Thelohan et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,858,465 A | 1/1999 | Hunt et al. |
| 5,874,375 A | 2/1999 | Zoitos et al. |
| 5,928,075 A | 7/1999 | Miya et al. |
| 5,932,500 A | 8/1999 | Jensen et al. |
| 5,935,886 A | 8/1999 | Jensen et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,013,592 A | 1/2000 | Merrill et al. |
| 6,025,288 A | 2/2000 | Zoitos et al. |
| 6,030,910 A | 2/2000 | Zoitos et al. |
| 6,036,762 A | 3/2000 | Sambasivan |
| 6,037,284 A | 3/2000 | Holstein et al. |
| 6,037,288 A | 3/2000 | Robinson et al. |
| 6,043,170 A | 3/2000 | Steinkopf et al. |
| 6,077,798 A | 6/2000 | Rapp |
| 6,156,683 A | 12/2000 | Grove-Rasmussen et al. |
| 6,180,546 B1 | 1/2001 | Jubb et al. |
| 6,284,684 B1 | 9/2001 | Vignesoult et al. |
| 6,309,994 B1 | 10/2001 | Marra et al. |
| 6,313,050 B1 | 11/2001 | De Merigno et al. |
| 6,346,494 B1 | 2/2002 | Jensen et al. |
| 6,358,872 B1 | 3/2002 | Karppinen et al. |
| 6,458,436 B1 | 10/2002 | Hansen et al. |
| 6,461,415 B1 | 10/2002 | Sambasivan et al. |
| 6,517,906 B1 | 2/2003 | Economy et al. |
| 6,551,951 B1 | 4/2003 | Fay et al. |
| 6,652,950 B2 | 11/2003 | Barney et al. |
| 6,716,407 B2 | 4/2004 | Davis et al. |
| 6,855,298 B2 | 2/2005 | Teneyck |
| 6,861,381 B1 | 3/2005 | Jubb et al. |
| 6,897,173 B2 | 5/2005 | Bernard et al. |
| 6,953,757 B2 | 10/2005 | Zoitos et al. |
| 7,153,796 B2 | 12/2006 | Jubb et al. |
| 7,160,824 B2 | 1/2007 | Zguris et al. |
| 7,259,118 B2 | 8/2007 | Jubb et al. |
| 7,468,336 B2 | 12/2008 | Zoitos et al. |
| 7,468,337 B2 | 12/2008 | Zoitos et al. |
| 7,470,641 B2 | 12/2008 | Jubb et al. |
| 7,550,118 B2 | 6/2009 | Merry et al. |
| 7,567,817 B2 | 7/2009 | Liu et al. |
| 7,638,447 B2 | 12/2009 | Bernard et al. |
| 7,651,965 B2 | 1/2010 | Jubb et al. |
| 7,704,902 B2 | 4/2010 | Maquin et al. |
| 7,709,027 B2 | 5/2010 | Fechner et al. |
| 7,781,043 B2 | 8/2010 | Nakayama et al. |
| 7,781,372 B2 | 8/2010 | Liu et al. |
| 7,803,729 B2 | 9/2010 | Keller et al. |
| 7,875,566 B2 | 1/2011 | Freeman et al. |
| 7,887,917 B2 | 2/2011 | Zoitos et al. |
| 7,897,255 B2 | 3/2011 | Liu et al. |
| 8,026,190 B2 | 9/2011 | Keller et al. |
| 8,147,952 B2 | 4/2012 | Iwamoto et al. |
| 8,163,377 B2 | 4/2012 | Wainwright et al. |
| 8,252,707 B2 | 8/2012 | McGinnis et al. |
| 8,343,400 B2 | 1/2013 | Cordts et al. |
| 8,551,897 B2 | 10/2013 | Zoitos et al. |
| 8,562,879 B2 | 10/2013 | Frost et al. |
| 8,663,774 B2 | 3/2014 | Fernando et al. |
| 8,834,758 B2 | 9/2014 | Endle et al. |
| 8,877,102 B2 | 11/2014 | Bernard et al. |
| 9,321,243 B2 | 4/2016 | Fernando et al. |
| 9,556,062 B2 | 1/2017 | Zhao et al. |
| 9,567,256 B2 | 2/2017 | Zoitos et al. |
| 2002/0022567 A1 | 2/2002 | Li et al. |
| 2002/0032116 A1 | 3/2002 | Jubb et al. |
| 2002/0107133 A1 | 8/2002 | Troczynski et al. |
| 2003/0015003 A1 | 1/2003 | Fisler et al. |
| 2003/0049329 A1 | 3/2003 | Lee et al. |
| 2003/0138673 A1 | 7/2003 | Sambasivan et al. |
| 2003/0162019 A1 | 8/2003 | Zoitos et al. |
| 2004/0011245 A1 | 1/2004 | Sambasivan et al. |
| 2005/0013873 A1 | 1/2005 | Fechner et al. |
| 2005/0032620 A1 | 2/2005 | Zoitos et al. |
| 2005/0079970 A1 | 4/2005 | Otaki et al. |
| 2005/0085369 A1 | 4/2005 | Jensen |
| 2005/0268656 A1 | 12/2005 | Raichel et al. |
| 2006/0094583 A1 | 5/2006 | Freeman et al. |
| 2006/0211562 A1 | 9/2006 | Fisler et al. |
| 2007/0020454 A1 | 1/2007 | Zoitos et al. |
| 2008/0146430 A1 | 6/2008 | Li et al. |
| 2008/0191179 A1 | 8/2008 | Bernard et al. |

(56) References Cited

U.S. PATENT DOCUMENTS

| | | |
|---|---|---|
| 2009/0042030 A1 | 2/2009 | Douce et al. |
| 2009/0053510 A1 | 2/2009 | Jubb |
| 2009/0130937 A1 | 5/2009 | Wainwright et al. |
| 2010/0055457 A1 | 3/2010 | Jubb |
| 2010/0093510 A1 | 4/2010 | Tanaka et al. |
| 2010/0184581 A1 | 7/2010 | Berthereau et al. |
| 2010/0209306 A1 | 8/2010 | Kunze et al. |
| 2010/0298110 A1 | 11/2010 | Richter et al. |
| 2011/0118102 A1 | 5/2011 | Zoitos et al. |
| 2011/0172077 A1 | 7/2011 | Lewis |
| 2012/0160104 A1 | 6/2012 | Vulfson |
| 2013/0225025 A1 | 8/2013 | McGinnis et al. |
| 2013/0333594 A1 | 12/2013 | Berthereau et al. |
| 2014/0273702 A1 | 9/2014 | Zoitos et al. |
| 2015/0175477 A1 | 6/2015 | Zhao et al. |
| 2018/0017519 A1 | 1/2018 | Zhao et al. |

FOREIGN PATENT DOCUMENTS

| | | |
|---|---|---|
| EP | 0 539 342 A1 | 4/1993 |
| EP | 0 834 489 A1 | 4/1998 |
| EP | 1 086 936 A2 | 3/2001 |
| EP | 1 323 687 A2 | 7/2003 |
| EP | 1 908 737 A1 | 4/2008 |
| FR | 2662687 | 12/1991 |
| GB | 520247 | 4/1940 |
| GB | 1 360 197 | 7/1974 |
| GB | 1 360 198 | 7/1974 |
| GB | 1 360 199 | 7/1974 |
| GB | 1 360 200 | 7/1974 |
| GB | 2 200 129 A | 7/1988 |
| GB | 2 383 793 | 7/2003 |
| JP | 2002/338300 | 11/2002 |
| JP | 06-272118 A | 10/2006 |
| JP | 07-033546 A | 2/2007 |
| JP | 07-303011 A | 11/2007 |
| JP | 4007482 B2 | 11/2007 |
| JP | 40-19111 B2 | 12/2007 |
| KR | 10-2004-0013848 A | 2/2004 |
| KR | 10-2010-0084917 A | 7/2010 |
| WO | WO 85/02393 A1 | 6/1985 |
| WO | WO 85/02394 A1 | 6/1985 |
| WO | WO 87/05007 A1 | 8/1987 |
| WO | WO 89/12032 A2 | 12/1989 |
| WO | WO 90/02713 A1 | 3/1990 |
| WO | WO 92/07801 A1 | 5/1992 |
| WO | WO 92/09536 A1 | 6/1992 |
| WO | WO 93/15208 A1 | 8/1993 |
| WO | WO 94/15883 A1 | 7/1994 |
| WO | WO 95/032925 | 12/1995 |
| WO | WO 95/32926 A1 | 12/1995 |
| WO | WO 96/05147 A1 | 2/1996 |
| WO | WO 98/32606 A1 | 7/1998 |
| WO | WO 98/51981 A1 | 11/1998 |
| WO | WO 02/16263 A1 | 2/2002 |
| WO | WO 03/031368 A2 | 4/2003 |
| WO | WO 03/050054 A1 | 6/2003 |
| WO | WO 03/059835 A1 | 7/2003 |
| WO | WO 2006/048610 | 5/2006 |
| WO | WO 2007/005836 A2 | 1/2007 |
| WO | WO 2007/086677 A1 | 8/2007 |

OTHER PUBLICATIONS

International Written Opinion for corresponding PCT/US2017/013932, dated May 1, 2017.

Wallenburger, et al. "Inviscid melt spinning: As-spun crystalline alumina fibers", J. Mater. Res., vol. 5, No. 11, Nov. 1990.

Shyu, Jiin-Juh and Wu, Jenn-Ming, Effect of $TiO_2$ addition on the nucleation of apatite in an $MgO$—$CaO$—$SiO$—$P_2O_5$ glass, Journal of Materials Science Letters, vol. 10, 1991.

INORGANIC FIBER

TECHNICAL FIELD

A high temperature resistant inorganic fiber that is useful as a thermal, electrical, or acoustical insulating material, and which has a use temperature of 1400° C. and greater is provided. The high temperature resistant inorganic fiber is easily manufacturable from a melt of raw material ingredients, exhibits low shrinkage after exposure to the use temperature, retains good mechanical performance after exposure to the use temperature, and exhibits low biopersistence in physiological fluids.

BACKGROUND

The insulation material industry has determined that it is desirable to utilize fibers in thermal, electrical and acoustical insulating applications, which do not persist in physiological fluids, that is, fiber compositions which exhibit a low biopersistence or a high solubility in physiological fluids. While candidate materials have been proposed, the use temperature limit of these materials have not been high enough to accommodate many of the applications to which traditional high temperature resistant alumino-silicate fibers are applied.

Many compositions within the synthetic vitreous fiber family of materials have been proposed which are non-durable or decomposable in a physiological medium.

The high temperature resistant fibers should also exhibit minimal linear shrinkage at expected use temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the fibers have mechanical strength characteristics during and following exposure to the use temperature, that will permit the fiber to maintain its structural integrity and insulating characteristics in use.

One characteristic of the mechanical integrity of an inorganic fiber is its after service friability. The more friable a fiber, that is, the more easily it is crushed or crumbled to a powder, the less mechanical integrity it possesses. In general, inorganic fibers that exhibit both high temperature resistance and non-durability in physiological fluids also exhibit a high degree of after service friability. This results in the fiber lacking the strength or mechanical integrity after exposure to the service temperature to be able to provide the necessary structure to accomplish its insulating purpose. Other measures of mechanical integrity of fibers include compression strength and compression recovery.

Thus, it is desirable to produce an improved inorganic fiber composition that is readily manufacturable from a fiberizable melt of desired ingredients, which exhibits low shrinkage during and after exposure to service temperatures of 1400° C. and greater, which exhibits low brittleness after exposure to the expected use temperatures, and which maintains mechanical integrity after exposure to use temperatures of 1400° C. and greater.

SUMMARY

Provided is an inorganic fiber comprising the fiberization product of about 65 to about 86 weight percent silica, about 14 to about 35 weight percent magnesia, and an intended addition of chromium oxide.

DETAILED DESCRIPTION

Provided is an inorganic fiber comprising the fiberization product of about 65 to about 86 weight percent silica, about 14 to about 35 weight percent magnesia, and an intended addition of chromium oxide, wherein said inorganic fiber exhibits a shrinkage of 5% or less at 1400° C. for 24 hours. According to certain illustrative embodiments, the inorganic fiber comprises the fiberization product of about 65 to about 86 weight percent silica, about 14 to about 35 weight percent magnesia, and an intended addition of chromium oxide, and wherein said inorganic fiber exhibits a shrinkage of 5% or less at 1260° C. for 24 hours.

According to certain illustrative embodiments, the inorganic fiber comprises the fiberization product of about 65 to about 86 weight percent silica, about 14 to about 35 weight percent magnesia, and an intended addition of chromium oxide, wherein said inorganic fiber exhibits a compression recovery up to 55% after exposure to a temperature of 1400° C. for 24 hours.

According to certain illustrative embodiments, the inorganic fiber comprises the fiberization product of about 65 to about 86 weight percent silica, about 14 to about 35 weight percent magnesia, and an intended addition of chromium oxide, and wherein said inorganic fiber exhibits a compression recovery up to 70% after exposure to a temperature of 1260° C. for 24 hours.

Also provided is a method for preparing a high temperature resistant inorganic fiber comprising forming a melt with ingredients comprising about 65 to about 86 weight percent silica, about 14 to about 35 weight percent magnesia, and an intended addition of chromium oxide-bearing raw material; and producing fibers from the melt. This method may include any of the disclosed fiber compositions.

It should be understood that when a range of values is described in the present disclosure, it is intended that any and every value within the range, including the end points, is to be considered as having been disclosed. For example, "a range of from 65 to 86" is to be read as indicating each and every possible number along the continuum between 65 and 86. It is to be understood that the inventors appreciate and understand that any and all values within the range are to be considered to have been specified, and that the inventors have possession of the entire range and all the values within the range.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness or safety of the composition.

In the present disclosure, the term "substantially" refers to a degree of deviation that is sufficiently small so as to not measurably detract from the identified property or circumstance. The exact degree of deviation allowable may in some cases depend on the specific context. The phrase "substantially free" means that the composition excludes any amount more than trace impurities that are not intentionally added to the fiber melt, but which may be present in the raw starting materials from which the fibers are produced.

The compositional weight percentages disclosed herein are based on the total weight of the fiber. It will be understood to one of ordinary skill in the art that the total weight percent of the fiber cannot exceed 100%. For example, a person of ordinary skill in the art would easily recognize and understand that a fiber composition comprising about 65 to about 86 weight percent silica, about 14 to about 35 weight percent magnesia and greater than 0 to about 5 weight percent chromium oxide will not exceed 100%. A person of ordinary skill in the art would understand that the amount of silica and magnesia will be adjusted to include the desired amount of silica, magnesia and chromium without exceeding 100% by weight of the fiber.

Also provided is a method of insulating an article with fibrous insulation prepared from a plurality of any one of the disclosed inorganic fibers. The method includes disposing on, in, near or around the article to be thermally insulated, a thermal insulation material comprising a plurality of the inorganic fibers comprising the fiberization product of any one of the fibers disclosed herein, such as an inorganic fiber comprising the fiberization product of about 65 to about 86 weight percent silica, about 14 to about 35 weight percent magnesia, and an intended addition of chromium oxide; and exposing the article to be thermally insulated to a temperature of 1400° C. or greater.

According to certain illustrative embodiments, the method of insulating an article includes disposing on, in, near or around the article to be thermally insulated, a thermal insulation material comprising a plurality of any one of the disclosed inorganic fibers, such as an inorganic fiber comprising the fiberization product of about 65 to about 86 weight percent silica, about 14 to about 35 weight percent magnesia, and an intended addition of chromium oxide; and exposing the article to be thermally insulated to a temperature of 1260° C. or greater.

An inorganic fiber that is useful as a thermal, electrical, and acoustical insulation material is provided. The inorganic fiber according to any of the disclosed compositions has a continuous service or continuous use temperature of 1260° C. while exhibiting a linear shrinkage of 4% or less. According to other embodiments, the inorganic fiber according to any of the disclosed compositions has a continuous service or use temperature of 1400° C. while exhibiting a linear shrinkage of 5% or less. The linear shrinkage of a fiber-containing thermal insulation article is determined by the linear shrinkage test method described below.

In order for a glass composition to be a viable candidate for producing a satisfactory high temperature resistant fiber product, the fiber to be produced must be manufacturable from a melt of ingredients, sufficiently soluble in physiological fluids, and capable of surviving high temperatures with minimal linear shrinkage and minimal loss of mechanical integrity during and after exposure to the high service temperatures.

The present inorganic fiber is non-biopersistant in physiological fluids. By "non-biopersistent" in physiological fluids, it is meant that the inorganic fiber at least partially dissolves in such physiological fluids, such as simulated lung fluid, during in vitro tests. The biopersistence of the inorganic fiber may be tested by measuring the rate at which mass is lost from the fiber ($ng/cm^2$-hr) under conditions which simulate the temperature and chemical conditions found in the human lung.

"Viscosity" refers to the ability of a glass melt to resist flow or shear stress. The viscosity-temperature relationship is critical in determining whether it is possible to fiberize a given glass composition from a melt of raw material ingredients. An optimum viscosity curve would have a low viscosity (5-50 poise) at the fiberization temperature and would gradually increase as the temperature decreased. If the melt is not sufficiently viscous (i.e. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. Viscosity modifiers permit fibers to be blown or spun from the fiber melt. It is desirable, however, that such viscosity modifiers, either by type or amount, do not adversely impact the solubility, shrinkage resistance, or mechanical strength of the blown or spun fiber.

One approach to testing whether a fiber of a defined composition can be readily manufactured at an acceptable quality level is to determine whether the viscosity curve of the experimental chemistry matches that of a known product which can be easily fiberized. Viscosity-temperature profiles may be measured on a viscometer, capable of operating at elevated temperatures. In addition, an adequate viscosity profile may be inferred by routine experimentation, examining the quality of the fiber (index, diameter, length) produced. The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of the composition, as will the overall steepness of the viscosity vs. temperature curve.

Linear shrinkage of an inorganic fiber is a measure of a fiber's dimensional stability at high temperatures or of its performance at a particular continuous service or use temperature. Fibers are tested for shrinkage by forming them into a mat and needle punching the mat into a pad of approximately 8 pounds per cubic foot density and a thickness of about 1 inch. Such pads are cut into 3 inch×5 inch pieces and platinum pins are inserted into the face of the material. The separation distance of these pins is then carefully measured and recorded. The pad is then placed into a furnace, ramped to test temperature and held at that temperature for a fixed period of time. After heating, the pin separation is again measured to determine the linear shrinkage that the pad has experienced during the test conditions.

In one such test, the length and width of the fiber pads were carefully measured, and the pad was placed in a furnace and brought to a temperature of 1400° C. for 24, 168, or 672 hours. After cooling, the lateral dimensions were measured and the linear shrinkage was determined by comparing the "before" and "after" measurements. If the fiber is available in blanket form, measurements may be made directly on the blanket without the need to form a pad.

Mechanical integrity is also an important property since the fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers. The ability of the fiber to maintain its integrity after exposure to the use temperature may also be measured mechanically by testing for compression strength and compression recovery. These tests measure, respectively, how easily the pad may be deformed and the amount of resiliency (or compression recovery) the pad exhibits after a compression of 50%. Visual and tactile observations indicate that the present inorganic fiber remains intact and maintains its form after exposure to a use temperature of at least 1400° C. for at least 24 hours.

The low shrinkage, high temperature resistant inorganic fiber comprises the fiberization product of a melt containing magnesia and silica as the primary constituents, with an intentional addition of a suitable amount of chromium oxide. The non-durable inorganic fibers are made by standard glass and ceramic fiber manufacturing methods. Raw materials, such as silica and any suitable source of magnesia such as enstatite, forsterite, magnesia, magnesite, calcined magnesite, magnesium zirconate, periclase, steatite, or talc may be used. If zirconia is included in the fiber melt, any suitable source of zirconia such as baddeleyite, magnesium zirconate, zircon or zirconia may be used. The raw material ingredients are introduced into a suitable furnace where they are melted and blown using a fiberization nozzle, or spun with a fiber spinning device, either in a batch or a continuous mode.

The low shrinkage, high temperature resistant inorganic fiber also comprises an intended addition of a chromium oxide-bearing raw material component as part of the fiber melt chemistry. The phrase "intended addition" means that a chromium oxide-bearing raw material is an intended melt component. The chromium oxide-bearing component may be provided either as an additive to the melt, or by using as ingredients of the melt appropriate amounts of materials containing chromium as a component, or both as an additive and as a component.

According to certain embodiments, the present inorganic fiber comprises the fiberization product of silica, magnesia, and greater than 0 to about 5 weight percent chromium oxide.

According to certain embodiments, the present inorganic fiber comprises the fiberization product of silica, magnesia, greater than 0 to about 5 weight percent chromium oxide, and greater than 0 to about 4 weight percent alumina.

According to certain embodiments, the present inorganic fiber comprises the fiberization product of silica, magnesia, greater than 0 to about 5 weight percent chromium oxide, and calcia.

According to certain embodiments, the present inorganic fiber comprises the fiberization product of silica, magnesia, greater than 0 to about 5 weight percent chromium oxide, and about 1 weight percent or less calcia.

According to certain embodiments, the present inorganic fiber comprises the fiberization product of silica, magnesia, greater than 0 to about 5 weight percent chromium oxide, and about 0.75 weight percent or less calcia.

According to certain embodiments, the present inorganic fiber comprises the fiberization product of silica, magnesia, greater than 0 to about 5 weight percent chromium oxide, and about 0.5 weight percent or less calcia.

According to certain embodiments, the present inorganic fiber comprises the fiberization product of silica, magnesia, greater than 0 to about 5 weight percent chromium oxide, and 0.25 weight percent or less calcia.

According to certain embodiments, the present inorganic fiber comprises the fiberization product of silica, magnesia, greater than 0 to about 5 weight percent chromium oxide, and substantially free of alkali metal oxides.

According to certain embodiments, the present inorganic fiber comprises the fiberization product of silica, magnesia, about 0.1 to about 5 weight percent chromium oxide, and greater than 0 to about 4 weight percent alumina.

According to certain embodiments, the present inorganic fiber comprises the fiberization product of silica, magnesia, about 0.1 to about 5 weight percent chromium oxide, substantially free of alkali metal oxides, and greater than 0 to about 4 weight percent alumina.

According to certain embodiments, the present inorganic fiber comprises the fiberization product of silica, magnesia, greater than 0 to about 5 weight percent chromium oxide, calcia, and greater than 0 to about 4 weight percent alumina.

According to certain embodiments, the present inorganic fiber comprises the fiberization product of silica, magnesia, greater than 0 to about 5 weight percent chromium oxide, about 1 weight percent or less calcia, and greater than 0 to about 4 weight percent alumina.

According to certain embodiments, the present inorganic fiber comprises the fiberization product of silica, magnesia, greater than 0 to about 5 weight percent chromium oxide, about 0.75 weight percent or less calcia, and greater than 0 to about 4 weight percent alumina.

According to certain embodiments, the present inorganic fiber comprises the fiberization product of silica, magnesia, greater than 0 to about 5 weight percent chromium oxide, about 0.50 weight percent or less calcia, and greater than 0 to about 4 weight percent alumina.

According to certain embodiments, the present inorganic fiber comprises the fiberization product of silica, magnesia, greater than 0 to about 5 weight percent chromium oxide, about 0.25 weight percent or less calcia, and greater than 0 to about 4 weight percent alumina.

According to certain embodiments, the present inorganic fiber comprises the fiberization product of about 65 to about 86 weight percent silica, about 14 to about 35 weight percent magnesia, and greater than 0 to about 5 weight percent chromium oxide.

According to certain embodiments, the present inorganic fiber comprises the fiberization product of about 65 to about 86 weight percent silica, about 14 to about 35 weight percent magnesia, greater than 0 to about 5 weight percent chromium oxide and substantially free of alkali metal oxides.

According to certain embodiments, the present inorganic fiber comprises the fiberization product of about 65 to about 86 weight percent silica, about 14 to about 35 weight percent magnesia, calcia, and greater than 0 to about 5 weight percent chromium oxide.

According to certain embodiments, the present inorganic fiber comprises the fiberization product of about 65 to about 86 weight percent silica, about 14 to about 35 weight percent magnesia, about 1 weight percent or less calcia, and greater than 0 to about 5 weight percent chromium oxide.

According to certain embodiments, the present inorganic fiber comprises the fiberization product of about 65 to about 86 weight percent silica, about 14 to about 35 weight percent magnesia, greater than 0 to about 5 weight percent chromium oxide, and greater than 0 to about 4 weight percent alumina.

According to certain embodiments, the present inorganic fiber comprises the fiberization product of about 65 to about 86 weight percent silica, about 14 to about 35 weight percent magnesia, greater than 0 to about 5 weight percent chromium oxide, greater than 0 to about 4 weight percent alumina, and calcia.

According to certain embodiments, the present inorganic fiber comprises the fiberization product of about 65 to about 86 weight percent silica, about 14 to about 35 weight percent magnesia, greater than 0 to about 5 weight percent chromium oxide, and about 1 weight percent or less calcia.

According to certain embodiments, the present inorganic fiber comprises the fiberization product of about 65 to about 86 weight percent silica, about 14 to about 35 weight percent magnesia, greater than 0 to about 5 weight percent chromium oxide, and about 0.75 weight percent or less calcia.

According to certain embodiments, the present inorganic fiber comprises the fiberization product of about 65 to about 86 weight percent silica, about 14 to about 35 weight percent magnesia, greater than 0 to about 5 weight percent chromium oxide, and about 0.5 weight percent or less calcia.

According to certain embodiments, the present inorganic fiber comprises the fiberization product of about 65 to about 86 weight percent silica, about 14 to about 35 weight percent magnesia, greater than 0 to about 5 weigh percent chromium oxide, and about 0.25 weight percent or less calcia.

According to certain embodiments, the present inorganic fiber comprises the fiberization product of about 72 to about 86 weight percent silica, about 14 to about 22 weight percent magnesia, and greater than 0 to about 5 weight percent chromium oxide.

According to certain embodiments, the present inorganic fiber comprises the fiberization product of about 72 to about 86 weight percent silica, about 14 to about 22 weight percent magnesia, greater than 0 to about 5 weight percent chromium oxide, and greater than 0 to about 4 weight percent alumina.

According to certain embodiments, the present inorganic fiber comprises the fiberization product of about 72 to about 86 weight percent silica, about 14 to about 22 weight percent magnesia, greater than 0 to about 5 weight percent chromium oxide, substantially free of alkali metal oxides, and greater than 0 to about 4 weight percent alumina.

According to certain embodiments, the present inorganic fiber comprises the fiberization product of about 72 to about 86 weight percent silica, about 14 to about 22 weight percent magnesia, calcia, greater than 0 to about 5 weight percent chromium oxide, and greater than 0 to about 4 weight percent alumina.

According to certain embodiments, the present inorganic fiber comprises the fiberization product of about 72 to about 86 weight percent silica, about 14 to about 22 weight percent magnesia, greater than 0 to about 5 weight percent chromium oxide, greater than 0 to about 4 weight percent alumina, and about 1 weight percent or less calcia.

According to certain embodiments, the present inorganic fiber comprises the fiberization product of about 72 to about 86 weight percent silica, about 14 to about 22 weight percent magnesia, greater than 0 to about 5 weight percent chromium oxide, greater than 0 to about 4 weight percent alumina, and about 0.75 weight percent or less calcia.

According to certain embodiments, the present inorganic fiber comprises the fiberization product of about 72 to about 86 weight percent silica, about 14 to about 22 weight percent magnesia, greater than 0 to about 5 weight percent chromium oxide, greater than 0 to about 4 weight percent alumina, and about 0.5 weight percent or less calcia.

According to certain embodiments, the present inorganic fiber comprises the fiberization product of about 72 to about 86 weight percent silica, about 12.5 to about 26.5 weight percent magnesia, greater than 0 to about 5 weight percent chromium oxide, greater than 0 to about 4 weight percent alumina, and about 0.25 weight percent or less calcia According to certain embodiments, the present inorganic fiber comprises the fiberization product of about 72 to about 80 weight percent silica, about 15 to about 25 weight percent magnesia, and greater than 0 to about 5 weight percent chromium oxide.

According to certain embodiments, the present inorganic fiber comprises the fiberization product of about 72 to about 80 weight percent silica, about 15 to about 25 weight percent magnesia, greater than 0 to about 5 weight percent chromium oxide, and greater than 0 to about 4 weight percent alumina.

According to certain embodiments, the present inorganic fiber comprises the fiberization product of about 72 to about 80 weight percent silica, about 15 to about 25 weight percent magnesia, greater than 0 to about 5 weight percent chromium oxide, greater than 0 to about 4 weight percent alumina, and calcia.

According to certain embodiments, the present inorganic fiber comprises the fiberization product of about 72 to about 80 weight percent silica, about 15 to about 25 weight percent magnesia, greater than 0 to about 5 weight percent chromium oxide, greater than 0 to about 4 weight percent alumina, and about 1 weight percent or less calcia.

According to certain embodiments, the present inorganic fiber comprises the fiberization product of about 72 to about 80 weight percent silica, about 15 to about 25 weight percent magnesia, greater than 0 to about 5 weight percent chromium oxide, greater than 0 to about 4 weight percent alumina, and about 0.75 weight percent or less calcia.

According to certain embodiments, the present inorganic fiber comprises the fiberization product of about 72 to about 80 weight percent silica, about 15 to about 25 weight percent magnesia, greater than 0 to about 5 weight percent chromium oxide, greater than 0 to about 4 weight percent alumina, and about 0.5 weight percent or less calcia.

According to certain embodiments, the present inorganic fiber comprises the fiberization product of about 72 to about 80 weight percent silica, about 15 to about 25 weight percent magnesia, greater than 0 to about 5 weight percent chromium oxide, greater than 0 to about 4 weight percent alumina, and about 0.25 weight percent or less calcia.

According to certain embodiments, the present inorganic fiber comprises the fiberization product of about 72 to about 80 weight percent silica, about 20 to about 28 weight percent magnesia, and greater than 0 to about 5 weight percent chromium oxide.

According to certain embodiments, the present inorganic fiber comprises the fiberization product of about 72 to about 80 weight percent silica, about 20 to about 28 weight percent magnesia, greater than 0 to about 5 weight percent chromium oxide, and greater than 0 to about 3 weight percent alumina.

According to certain embodiments, the present inorganic fiber comprises the fiberization product of about 72 to about 80 weight percent silica, about 20 to about 28 weight percent magnesia, greater than 0 to about 5 weight percent chromium oxide, greater than 0 to about 3 weight percent alumina, and substantially free of alkali metal oxides.

According to certain embodiments, the present inorganic fiber comprises the fiberization product of about 72 to about 80 weight percent silica, about 20 to about 28 weight percent magnesia, greater than 0 to about 5 weight percent chromium oxide, greater than 0 to about 3 weight percent alumina, and calcia According to certain embodiments, the present inorganic fiber comprises the fiberization product of about 72 to about 80 weight percent silica, about 20 to about 28 weight percent magnesia, greater than 0 to about 5 weight percent chromium oxide, greater than 0 to about 3 weight percent alumina, and about 1 weight percent or less calcia.

According to certain embodiments, the present inorganic fiber comprises the fiberization product of about 72 to about 80 weight percent silica, about 20 to about 28 weight percent magnesia, greater than 0 to about 5 weight percent chromium oxide, greater than 0 to about 3 weight percent alumina, and about 0.75 weight percent or less calcia.

According to certain embodiments, the present inorganic fiber comprises the fiberization product of about 72 to about 80 weight percent silica, about 20 to about 28 weight percent magnesia, greater than 0 to about 5 weight percent chromium oxide, greater than 0 to about 3 weight percent alumina, and about 0.5 weight percent or less calcia.

According to certain embodiments, the present inorganic fiber comprises the fiberization product of about 72 to about 80 weight percent silica, about 20 to about 28 weight percent magnesia, greater than 0 to about 5 weight percent chromium oxide, greater than 0 to about 3 weight percent alumina, and about 0.25 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, and greater than 0 to about 4 weight percent alumina.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 4 weight percent alumina, and substantially free of alkali metal oxides.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 4 weight percent alumina, and calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 4 weight percent alumina, and about 1 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 4 weight percent alumina, and about 0.75 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 4 weight percent alumina, and about 0.5 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 4 weight percent alumina, and about 0.25 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, and greater than 0 to about 2 weight percent alumina.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 2 weight percent alumina, and substantially free of alkali metal oxides.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 2 weight percent alumina, and calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 2 weight percent alumina, and about 1 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 2 weight percent alumina, and about 0.75 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 2 weight percent alumina, and about 0.5 weight percent or less calcia.

According to certain embodiments, the present inorganic fiber comprises the fiberization product of about 70 to about 80 weight percent silica, about 15 to about 30 weight percent magnesia, greater than 0 to about 5 weight percent chromium oxide, greater than 0 to about 2 weight percent alumina, and about 0.25 weight percent or less calcia.

According to certain embodiments, the present inorganic fiber comprises the fiberization product of about 75 to about 79 weight percent silica, about 15 to about 25 weight percent magnesia, and greater than 0 to about 5 weight percent chromium oxide.

According to certain embodiments, the present inorganic fiber comprises the fiberization product of about 75 to about 79 weight percent silica, about 15 to about 25 weight percent magnesia, greater than 0 to about 5 weight percent chromium oxide, and greater than 0 to about 4 weight percent alumina.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 4 weight percent alumina, and substantially free of alkali metal oxides.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 4 weight percent alumina, and calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 4 weight percent alumina, and about 1 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 4 weight percent alumina, and about 0.75 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 4 weight percent alumina, and about 0.5 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 4 weight percent alumina, and about 0.25 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, and greater than 0 to about 2 weight percent alumina.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 2 weight percent alumina, and substantially free of alkali metal oxides.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 2 weight percent alumina, and calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 2 weight percent alumina, and about 1 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 2 weight percent alumina, and about 0.75 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 2 weight percent alumina, and about 0.5 weight percent or less calcia.

According to certain embodiments, the present inorganic fiber comprises the fiberization product of about 75 to about 79 weight percent silica, about 15 to about 25 weight percent magnesia, greater than 0 to about 5 weight percent chromium oxide, greater than 0 to about 2 weight percent alumina, and about 0.25 weight percent or less calcia.

According to certain embodiments, the present inorganic fiber comprises the fiberization product of about 75 to about 79 weight percent silica, about 18 to about 24 weight percent magnesia, about 0.1 to about 4 weight percent chromium oxide, and greater than 0 to about 2 weight percent alumina.

According to certain embodiments, the present inorganic fiber comprises the fiberization product of about 75 to about 79 weight percent silica, about 18 to about 24 weight percent magnesia, about 0.1 to about 4 weight percent chromium oxide, greater than 0 to about 2 weight percent alumina, and substantially free of alkali metal oxides.

According to certain embodiments, the present inorganic fiber comprises the fiberization product of about 75 to about 79 weight percent silica, about 18 to about 24 weight percent magnesia, about 0.1 to about 4 weight percent chromium oxide, greater than 0 to about 2 weight percent alumina, and calcia.

According to certain embodiments, the present inorganic fiber comprises the fiberization product of about 75 to about 79 weight percent silica, about 18 to about 24 weight percent magnesia, about 0.1 to about 4 weight percent chromium oxide, greater than 0 to about 2 weight percent alumina, and about 1 weight percent or less calcia.

According to certain embodiments, the present inorganic fiber comprises the fiberization product of about 75 to about 79 weight percent silica, about 18 to about 24 weight percent magnesia, about 0.1 to about 4 weight percent chromium oxide, greater than 0 to about 2 weight percent alumina, and about 0.75 weight percent or less calcia.

According to certain embodiments, the present inorganic fiber comprises the fiberization product of about 75 to about 79 weight percent silica, about 18 to about 24 weight percent magnesia, about 0.1 to about 4 weight percent chromium oxide, greater than 0 to about 2 weight percent alumina, and about 0.5 weight percent or less calcia.

According to certain embodiments, the present inorganic fiber comprises the fiberization product of about 75 to about 79 weight percent silica, about 18 to about 24 weight percent magnesia, about 0.1 to about 4 weight percent chromium oxide, greater than 0 to about 2 weight percent alumina, and about 0.25 weight percent or less calcia.

According to certain embodiments, the present inorganic fiber comprises the fiberization product of about 75 to about 79 weight percent silica, about 18 to about 24 weight percent magnesia, about 0.1 to about 3 weight percent chromium oxide, and greater than 0 to about 2 weight percent alumina.

According to certain embodiments, the present inorganic fiber comprises the fiberization product of about 75 to about 79 weight percent silica, about 18 to about 24 weight percent magnesia, about 0.1 to about 3 weight percent chromium oxide, greater than 0 to about 2 weight percent alumina, and substantially free of alkali metal oxides.

According to certain embodiments, the present inorganic fiber comprises the fiberization product of about 75 to about 79 weight percent silica, about 18 to about 24 weight percent magnesia, about 0.1 to about 3 weight percent chromium oxide, greater than 0 to about 2 weight percent alumina, and calcia.

According to certain embodiments, the present inorganic fiber comprises the fiberization product of about 75 to about 79 weight percent silica, about 18 to about 24 weight percent magnesia, about 0.1 to about 3 weight percent chromium oxide, greater than 0 to about 2 weight percent alumina, and about 1 weight percent or less calcia.

According to certain embodiments, the present inorganic fiber comprises the fiberization product of about 75 to about 79 weight percent silica, about 18 to about 24 weight percent magnesia, about 0.1 to about 2 weight percent chromium oxide, and greater than 0 to about 2 weight percent alumina.

According to certain embodiments, the present inorganic fiber comprises the fiberization product of about 75 to about 79 weight percent silica, about 18 to about 24 weight percent magnesia, about 0.1 to about 2 weight percent chromium oxide, greater than 0 to about 2 weight percent alumina, and substantially free of alkali metal oxides.

According to certain embodiments, the present inorganic fiber comprises the fiberization product of about 75 to about 79 weight percent silica, about 18 to about 24 weight percent magnesia, about 0.1 to about 2 weight percent chromium oxide, greater than 0 to about 2 weight percent alumina, and calcia.

According to certain embodiments, the present inorganic fiber comprises the fiberization product of about 75 to about 79 weight percent silica, about 18 to about 24 weight percent magnesia, about 0.1 to about 2 weight percent chromium oxide, greater than 0 to about 2 weight percent alumina, and about 1 weight percent or less calcia.

According to certain embodiments, the present inorganic fiber comprises the fiberization product of about 75 to about 79 weight percent silica, about 18 to about 24 weight percent magnesia, about 0.1 to about 1 weight percent chromium oxide, and greater than 0 to about 2 weight percent alumina.

According to certain embodiments, the present inorganic fiber comprises the fiberization product of about 75 to about 79 weight percent silica, about 18 to about 24 weight percent magnesia, about 0.1 to about 1 weight percent chromium oxide, greater than 0 to about 2 weight percent alumina, and substantially free of alkali metal oxides.

According to certain embodiments, the present inorganic fiber comprises the fiberization product of about 75 to about 79 weight percent silica, about 18 to about 24 weight percent magnesia, about 0.1 to about 1 weight percent chromium oxide, greater than 0 to about 2 weight percent alumina, and calcia.

According to certain embodiments, the present inorganic fiber comprises the fiberization product of about 75 to about 79 weight percent silica, about 18 to about 24 weight percent magnesia, about 0.1 to about 1 weight percent chromium oxide, greater than 0 to about 2 weight percent alumina, and about 1 weight percent or less calcia.

According to certain embodiments, the present inorganic fiber comprises the fiberization product of 70 weight percent or greater silica, magnesia, greater than 0 to about 5 weight percent chromium oxide, and greater than 0 to about 4 weight percent alumina.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and substantially free of alkali metal oxides.

According to certain embodiments, the present inorganic fiber comprises the fiberization product of 70 weight percent or greater silica, magnesia, greater than 0 to about 5 weight percent chromium oxide, calcia, and greater than 0 to about 4 weight percent alumina.

According to certain embodiments, the present inorganic fiber comprises the fiberization product of 70 weight percent or greater silica, magnesia, greater than 0 to about 5 weight percent chromium oxide, about 1 weight percent or less calcia, and greater than 0 to about 4 weight percent alumina.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and about 0.75 weight percent or less calcia.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and about 0.5 weight percent or less calcia.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and about 0.25 weight percent or less calcia.

According to certain embodiments, the present inorganic fiber comprises the fiberization product of 70 weight percent or greater silica, magnesia, greater than 0 to about 4 weight percent chromium oxide, greater than 0 to about 4 weight percent alumina, and calcia.

According to certain embodiments, the present inorganic fiber comprises the fiberization product of 70 weight percent or greater silica, magnesia, greater than 0 to about 4 weight percent chromium oxide, greater than 0 to about 4 weight percent alumina, and about 1 weight percent or less calcia.

According to certain embodiments, the present inorganic fiber comprises the fiberization product of 70 weight percent or greater silica, magnesia, greater than 0 to about 4 weight percent chromium oxide, greater than 0 to about 4 weight percent alumina, and about 0.75 weight percent or less calcia.

According to certain embodiments, the present inorganic fiber comprises the fiberization product of 70 weight percent or greater silica, magnesia, greater than 0 to about 4 weight percent chromium oxide, greater than 0 to about 4 weight percent alumina, and about 0.5 weight percent or less calcia.

According to certain embodiments, the present inorganic fiber comprises the fiberization product of 70 weight percent or greater silica, magnesia, greater than 0 to about 4 weight percent chromium oxide, greater than 0 to about 4 weight percent alumina, and about 0.25 weight percent or less calcia.

According to certain embodiments, the present inorganic fiber comprises the fiberization product of 70 weight percent or greater silica, magnesia, greater than 0 to about 3 weight percent chromium oxide, greater than 0 to about 4 weight percent alumina, and calcia.

According to certain embodiments, the present inorganic fiber comprises the fiberization product of 70 weight percent or greater silica, magnesia, greater than 0 to about 3 weight percent chromium oxide, greater than 0 to about 4 weight percent alumina, and 1 weight percent or less calcia.

According to certain embodiments, the present inorganic fiber comprises the fiberization product of 70 weight percent or greater silica, magnesia, greater than 0 to about 3 weight percent chromium oxide, greater than 0 to about 4 weight percent alumina, and about 0.75 weight percent or less calcia.

According to certain embodiments, the present inorganic fiber comprises the fiberization product of 70 weight percent or greater silica, magnesia, greater than 0 to about 3 weight percent chromium oxide, greater than 0 to about 4 weight percent alumina, and about 0.5 weight percent or less calcia.

According to certain embodiments, the present inorganic fiber comprises the fiberization product of 70 weight percent or greater silica, magnesia, greater than 0 to about 3 weight percent chromium oxide, greater than 0 to about 4 weight percent alumina, and about 0.25 weight percent or less calcia.

According to certain embodiments, the present inorganic fiber comprises the fiberization product of 70 weight percent or greater silica, magnesia, greater than 0 to about 2 weight percent chromium oxide, greater than 0 to about 4 weight percent alumina, and calcia.

According to certain embodiments, the present inorganic fiber comprises the fiberization product of 70 weight percent or greater silica, magnesia, greater than 0 to about 2 weight percent chromium oxide, greater than 0 to about 4 weight percent alumina, and about 1 weight percent or less calcia.

According to certain embodiments, the present inorganic fiber comprises the fiberization product of 70 weight percent or greater silica, magnesia, greater than 0 to about 2 weight percent chromium oxide, greater than 0 to about 4 weight percent alumina, and about 0.75 weight percent or less calcia.

According to certain embodiments, the present inorganic fiber comprises the fiberization product of 70 weight percent or greater silica, magnesia, greater than 0 to about 2 weight percent chromium oxide, greater than 0 to about 4 weight percent alumina, and about 0.5 weight percent or less calcia.

According to certain embodiments, the present inorganic fiber comprises the fiberization product of 70 weight percent or greater silica, magnesia, greater than 0 to about 2 weight percent chromium oxide, greater than 0 to about 4 weight percent alumina, and about 0.25 weight percent or less calcia.

According to certain embodiments, the present inorganic fiber comprises the fiberization product of 70 weight percent or greater silica, magnesia, greater than 0 to about 1 weight percent chromium oxide, greater than 0 to about 4 weight percent alumina, and calcia.

According to certain embodiments, the present inorganic fiber comprises the fiberization product of 70 weight percent or greater silica, magnesia, greater than 0 to about 1 weight percent chromium oxide, greater than 0 to about 4 weight percent alumina, and about 1 weight percent or less calcia.

According to certain embodiments, the present inorganic fiber comprises the fiberization product of 70 weight percent or greater silica, magnesia, greater than 0 to about 1 weight percent chromium oxide, greater than 0 to about 4 weight percent alumina, and about 0.75 weight percent or less calcia.

According to certain embodiments, the present inorganic fiber comprises the fiberization product of 70 weight percent or greater silica, magnesia, greater than 0 to about 1 weight percent chromium oxide, greater than 0 to about 4 weight percent alumina, and about 0.5 weight percent or less calcia.

According to certain embodiments, the present inorganic fiber comprises the fiberization product of 70 weight percent or greater silica, magnesia, greater than 0 to about 1 weight percent chromium oxide, greater than 0 to about 4 weight percent alumina, and about 0.25 weight percent or less calcia.

According to certain embodiments, the present inorganic fiber comprises the fiberization product of 70 weight percent or greater silica, magnesia, greater than 0 to about 5 weight percent chromium oxide, greater than and 0 to about 4 weight percent alumina, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and 1 weight percent or less calcia, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and 0.5 weight percent or less calcia, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 5 weight percent chromium oxide, greater than 0 to about 4 weight percent alumina, and 0.3 weight percent or less calcia, wherein the fibers exhibits a shrinkage of 5% or less after exposure to 1400° C. for 24 hours.

According to certain embodiments, the present inorganic fiber comprises the fiberization product of 70 weight percent or greater silica, magnesia, about 0.1 to about 5 weight percent chromium oxide, and greater than 0 to about 4 weight percent alumina, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 4 weight percent chromium oxide, and greater than 0 to about 4 weight percent alumina, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 3 weight percent chromium oxide, and greater than 0 to about 4 weight percent alumina, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 2 weight percent chromium oxide, and greater than 0 to about 4 weight percent alumina, wherein the fibers exhibits a shrinkage of 5% or less after exposure to 1400° C. for 24 hours.

According to certain embodiments, the present inorganic fiber comprises the fiberization product of 70 weight percent or greater silica, magnesia, greater than 0 to about 1 weight percent chromium oxide, and greater than 0 to about 4 weight percent alumina, wherein the fibers exhibits a shrinkage of 5% or less after exposure to 1400° C. for 24 hours.

In connection with all of the described embodiments of the inorganic fiber, in addition to magnesia, silica and chromium oxide, the magnesium-silicate fiber containing an intended chromium oxide addition may contain calcia impurity. In certain embodiments, the fiber does not contain more than about 1 weight percent calcia impurity. In other embodiments, the fiber contains less than 0.75 weight percent calcia impurity. In other embodiments, the fiber contains less than 0.5 weight percent calcia impurity. In other embodiments, the fiber contains less than 0.25 weight percent calcia.

In connection with all of the described embodiments of the inorganic fiber, in addition to magnesia, silica, the fiber may contain the intended chromium oxide addition in an amount of greater than 0 to about 5 weight percent, in an amount of greater than 0 to about 4.5 weight percent, in an amount of greater than 0 to about 4 weight percent, in an amount of greater than 0 to about 3.5 weight percent, in an amount of greater than 0 to about 3 weight percent, in an amount of greater than 0 to about 2.5 weight percent, in an amount of greater than 0 to about 2 weight percent, in an amount of greater than 0 to about 1 weight percent, in an amount of greater than 0 to about 0.75 weight percent, in an amount of greater than 0 to about 0.5 weight percent, in an amount of greater than 0 to about 0.25 weight percent, in an amount of about 1 to about 5 weight percent, in an amount of about 1.25 to about 5 weight percent, in an amount of about 1.5 to about 5 weight percent, in an amount of about 2 to about 5 weight percent, in an amount of about 2.5 to about 5 weight percent, in an amount of about 3 to about 5 weight percent, in an amount of about 3.5 to about 5 weight percent, in an amount of about 4 to about 5 weight percent, or in an amount of about 4.5 to about 5 weight percent, in an amount of about 1 to about 4 weight percent, in an amount of about 1.25 to about 4 weight percent, in an amount of about 1.5 to about 4 weight percent, in an amount of about 2 to about 4 weight percent, in an amount of about 2.5 to about 4 weight percent, in an amount of about 3 to about 4 weight percent, in an amount of about 3.5 to about 4 weight percent, in an amount of about 1 to about 3 weight percent, in an amount of about 1.25 to about 3 weight percent, in an amount of about 1.5 to about 3 weight percent, in an amount of about 2 to about 3 weight percent, in an amount of about 2.5 to about 3 weight percent, in an amount of about 1 to about 2 weight percent, in an amount of about 1.25 to about 2 weight percent, in an amount of about 1.5 to about 2 weight percent, or in an amount of about 1.75 to about 2 weight percent, in an amount of 0.1 to about 3 weight percent, in an amount of 0.2 to about 3 weight percent, in an amount of 0.3 to about 3 weight percent, in an amount of 0.4 to about 3 weight percent, in an amount of 0.5 to about 3 weight percent, in an amount of 0.6 to about 3 weight percent in an amount of 0.7 to about 3 weight percent, in an amount of 0.8 to about 3 weight percent, in an amount of 0.9 to about 3 weight percent, in an amount of 0.1 to about 1.5 weight percent, in an amount of 0.2 to about 1.5 weight percent, in an amount of 0.3 to about 1.5 weight percent, in an amount of 0.4 to about 1.5 weight percent, in an amount of 0.5 to about 1.5 weight percent, in an amount of 0.6 to about 1.5 weight percent in an amount of 0.7 to about 1.5 weight percent, in an amount of 0.8 to about 1.5 weight percent, in an amount of 0.9 to about 1.5 weight percent, in an amount of 0.1 to about 1 weight percent, in an amount of 0.2 to about 1 weight percent, in an amount of 0.3 to about 1 weight percent, in an amount of 0.4 to about 1 weight percent, in an amount of 0.5 to about 1 weight percent, in an amount of 0.6 to about 1 weight percent in an amount of 0.7 to about 1 weight percent, in an amount of 0.8 to about 1 weight percent, in an amount of 0.9 to about 1 weight percent For all of the embodiments of the fiberization product described herein, the total weight of the components of the fiber is 100%.

In connection with all of the described embodiments of the inorganic fiber, the fibers containing an intended chromium oxide addition exhibit a linear shrinkage after exposure to a service temperature of 1400° C. for 24 hours of 5 percent or less. In certain embodiments, the fibers containing an intended chromium oxide addition exhibit a linear shrinkage after exposure to a service temperature of 1260° C. for 24 hours of 5 percent or less. In certain embodiments, the fibers containing an intended chromium oxide addition exhibit a linear shrinkage after exposure to a service temperature of 1400° C. for 24 hours of 5 percent or less and a linear shrinkage after exposure to a service temperature of 1260° C. for 24 hours of 4 percent or less.

The fibers containing an intended chromium oxide addition are useful for thermal insulating applications at continuous service or operating temperatures of at least 1400° C. or greater. According to certain embodiments, the fibers containing chromium oxide are useful for thermal insulating applications at continuous service or operating temperatures of at least 1400° C. and it has been found that the fibers containing the chromium oxide addition do not melt until they are exposed to a temperature of 1500° C. or greater.

The inorganic fibers may be prepared by fiber blowing or fiber spinning techniques. A suitable fiber blowing technique includes the steps of mixing the starting raw materials containing magnesia, silica, and chromium oxide bearing compound together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the fibers.

A suitable fiber spinning technique includes the steps of mixing the starting raw materials containing magnesia, silica, and chromium oxide bearing compound together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

In some embodiments, the fiber is produced from a melt of raw materials by subjecting the molten stream to a jet of high pressure/high velocity air or by pouring the melt onto rapidly spinning wheels and spinning fiber centrifugally. If the chromium oxide bearing compound is provided as an additive to the melt, then a suitable source of the chromium oxide raw material is simply added at the proper amount to the raw materials being melted.

The addition of an intended chromium oxide bearing compound may be as a component of the raw material melt which are fiberized, or as a coating which is applied to the exterior surfaces of the fiber, or both. It has unexpectedly been found that an inorganic fiber comprising an intended chromium oxide bearing compound as a fiberization component exhibits superior properties, such as decreased biopersistence, as compared to a similar fiber coated with a chromium oxide bearing compound. The inclusion of an intentional addition of chromium oxide results in a decrease of linear shrinkage of the resulting fiber after exposure to the use temperature. In addition to improvements in shrinkage, the addition of an intended chromium oxide bearing compound as a component of the raw materials which are fiberized decreases the temperature of solidification and results in an improved viscosity of the fiberization melt.

In addition to the chromium oxide bearing containing compound, the viscosity of the material melt of ingredients may optionally be controlled by the presence of other viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

Other compounds which may be utilized to enhance the viscosity of the fiber melt include alkali metal oxides, alumina and boria. Other elements or compounds may be utilized as viscosity modifiers which, when added to the melt, affect the melt viscosity so as to approximate the profile, or shape, of the viscosity/temperature curve of a melt that is readily fiberizable.

A method for preparing a low shrinkage, high temperature resistant, fiber containing an intended chromium oxide addition and having a use temperature of at least 1400° C. or greater is provided. The method of forming the fiber includes forming a material melt of ingredients comprising magnesia, silica, and a chromium oxide bearing compound and forming fibers from the melt of ingredients. The amounts of silica, magnesia, chromium oxide bearing compound and incidental raw material impurities may be selected from any of the above-described illustrative embodiments.

In other embodiments, the method of forming the fiber includes forming a material melt of ingredients comprising magnesia and silica, forming fibers from the melt of ingredients and coating the resulting fiber at the point of fiberization or after fiberization with an intended chromium oxide bearing compound. The amounts of silica, magnesia, and chromium oxide bearing compound may be selected from any of the above-described illustrative embodiments.

In other embodiments, the method of forming the fiber includes forming a material melt of ingredients comprising magnesia, silica, and an intended chromium oxide containing compound, forming fibers from the melt of ingredients and coating the resulting fiber at the point of fiberization or after fiberization with an intended chromium oxide bearing containing compound.

The fiber may be manufactured with existing fiberization technology and formed into multiple thermal insulation product forms, including but not limited to bulk fibers, fiber-containing blankets, boards, papers, felts, mats, blocks, modules, coatings, cements, moldable compositions, pumpable compositions, putties, ropes, braids, wicking, textiles (such as cloths, tapes, sleeving, string, yarns, etc . . . ), vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders and the like, in the production of fiber-containing paper and felt.

A method of insulating an article at temperatures of 1260° C. and greater, or 1400° C. and greater, using a thermal insulation containing any one of the disclosed fibers is also provided. The method of insulating an article includes disposing on, in, near, or around the article to be insulated, a thermal insulation material that contains the fibers containing an intended chromium oxide addition.

The high temperature resistant inorganic fibers are readily manufacturable from a melt having a viscosity suitable for blowing or spinning fiber, are substantially non-biopersistent in physiological fluids, exhibit good mechanical strength up to the service temperature, exhibit excellent linear shrinkage up to 1400° C., and improved viscosity for fiberization.

EXAMPLES

The following examples are set forth to describe illustrative embodiments of the fibers containing an intentional chromium oxide addition in further detail and to illustrate the methods of preparing the inorganic fibers, preparing thermal insulating articles containing the fibers and using the fibers as thermal insulation. However, the examples should not be construed as limiting the fiber, the fiber containing articles, or the processes of making or using the fibers as thermal insulation in any manner.

Linear Shrinkage

A shrinkage pad was prepared by needling a fiber mat using a bank of felting needles. A 3 inch×5 inch test piece was cut from the pad and was used in the shrinkage testing. The length and width of the test pad was carefully measured. The test pad was then placed into a furnace and brought to a temperature of 1400° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

Compression Recovery

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to a use temperature of 1260° C. and 1400° C. for 24 hours. According to certain illustrative embodiments, the test pads manufactured from the inorganic fibers exhibit a compression recovery of at least 10 percent.

Fiber Dissolution

The inorganic fiber is non-durable or non-biopersistent in physiological fluids. By "non-durable" or "non-biopersistent" in physiological fluids it is meant that the inorganic fiber at least partially dissolves or decomposes in such fluids, such as simulated lung fluid, during in vitro tests.

The durability test measures the rate at which mass is lost from the fiber (ng/cm$^2$-hr) under conditions which simulate the temperature and chemical conditions found in the human lung. In particular, the fibers discussed herein are highly soluble in Simulated Lung Fluid at a pH of 7.4.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm$^2$-hr are considered indicative of a non-biopersistent fiber. The composition for the simulated lung fluid, which was used to test the durability of the fiber compositions of the present invention:

| Constituent | Amount/Make-up |
| --- | --- |
| NH$_4$Cl | 10.72 g/50 mL |
| NaCl | 135.6 g |
| NaHCO$_3$ | 45.36 g |

-continued

| Constituent | Amount/Make-up |
|---|---|
| $NaH_2PO_4 \cdot H_2O$ solution | 3.31 g/50 mL |
| $Na_3C_6H_5O_7 \cdot H_2O$ solution | 1.18 g/50 mL |
| Glycine | 9.08 g |
| $H_2SO_4$(1N solution) | 20.0 mL |
| $CaCl_2$ (2.75 wt. % solution) | 15.8 mL |
| Formaldehyde | 20.0 mL |

To approximately 18 liters of deionized water, sequentially add the above reagents in the amounts shown in the above table. Dilute the mixture to 20 liters with deionized water and continue to stir contents with magnetic stir bar or other suitable means for at least 15 minutes.

TABLE I

| Sample | $SiO_2$ | MgO | $Al_2O_3$ | CaO | $Fe_2O_3$ | $Cr_2O_3$ |
|---|---|---|---|---|---|---|
| C1* | 56.3 | 0 | 43.7 | 0 | 0 | 0 |
| C2** | 78.5 | 18.8 | 1.84 | 0.40 | 0.23 | 0 |
| 3 | 73.31 | 24.70 | 0.29 | 0.17 | 0.14 | 1.36 |
| 4 | 68.35 | 30.01 | 0.16 | 0.19 | 0.14 | 1.12 |
| 5 | 68.35 | 30.01 | 0.16 | 0.19 | 0.14 | 1.12 |
| 6 | 67.02 | 27.65 | 0.20 | 0.28 | 0.13 | 4.59 |
| 7 | 78.99 | 19.41 | 1.31 | 0.16 | 0.08 | 0.14 |
| 8 | 78.99 | 19.41 | 1.31 | 0.16 | 0.08 | 0.14 |
| 9 | 75.98 | 21.47 | 1.41 | 0.22 | 0.17 | 0.67 |
| 10 | 78.03 | 19.16 | 1.27 | 0.15 | 0.18 | 1.16 |
| 11 | 77.65 | 20.49 | 0.20 | 0.15 | 0.13 | 1.35 |

*Blanket commercially available from Unifrax I LLC (Tonawanda, NY, USA) under the designation FIBERFRAX DURABLANKET 2600.
**Blanket commercially available from Unifrax I LLC (Tonawanda, NY, USA) under the designation ISOFRAX Blanket.
C = comparative

TABLE II

| Sample | Fiber Diameter Mean μm | 24 Hour Shrinkage 1260° C. % | 24 Hour Shrinkage 1400° C. % | Compress Recovery 1260° C. % | Compress Recovery 1400° C. % | Compress Strength 1260° C. psi | Compress Strength 1400° C. psi | K (Dissolution) 6-hr ng/cm²/hr |
|---|---|---|---|---|---|---|---|---|
| C1 | 4.62 | 4.6 | 10.1 | 62.5 | 49.1 | 7.7 | 16.7 | 25 |
| C2 | 7.62 | 7.8 | 10.0 | 31.9 | 8.0 | 6.3 | 3.1 | 400 |
| 3 | 8.5 | 2.3 | 2.8 | — | — | 5.8 | 2.3 | 914 |
| 4 | 3.8 | 1.8 | 5.5 | — | — | 1.7 | 2.0 | 1787 |
| 5 | 4.2 | 2.2 | 4.3 | — | — | 2.3 | 1.8 | — |
| 6 | 4.1 | 2.6 | 4.2 | — | — | 2.3 | 1.6 | 483 |
| 7 | 8.0 | 3.5 | 4.6 | 70 | 36 | 4.8 | 3.1 | 879 |
| 8 | 5.4 | 2.8 | 3.7 | 68 | 16 | 2.7 | 1.6 | 879 |
| 9 | 6.3 | 3.1 | 4.1 | 55 | 21 | 3.7 | 1.4 | 573 |
| 10 | 5.8 | 3.9 | 4.8 | 66 | 13 | 10.1 | 3.8 | 517 |
| 11 | 6.1 | 2.9 | 3.1 | 71 | 55 | 2.8 | 2.3 | 1166 |

As is shown in Table II above, magnesium-silicate fiber samples which included an intended chromium oxide addition, measured as $Cr_2O_3$, generally exhibited excellent linear shrinkage values as compared to known refractory ceramic fibers based on alumino-silicate chemistry and known non-biopersistent alkaline earth silicate fibers. Compression recovery and dissolution rate remained satisfactory. The magnesium-silicate fiber composition examples containing an intentional addition of chromium oxide exhibit improved compression recovery at both 1260° C. and 1400° C., as compared to magnesium-silicate fibers without such a chromium oxide addition, while still maintaining excellent linear shrinkage and dissolution properties in physiological fluid.

While the inorganic fiber, thermal insulation, methods of preparing the inorganic fiber, and methods of insulating articles using the thermal insulation have been described in connection with various embodiments, it is to be understood that other similar embodiments may be used or modifications and additions may be made to the described embodiments for performing the same function. Furthermore, the various illustrative embodiments may be combined to produce the desired results. Therefore, the inorganic fiber, thermal insulation, methods of preparing the inorganic fiber, and methods of insulating articles using the thermal insulation should not be limited to any single embodiment, but rather construed in breadth and scope in accordance with the recitation of the appended claims. It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. An inorganic fiber comprising a fiberization product of about 65 to about 86 weight percent silica, about 14 to about 35 weight percent magnesia, and greater than 0 to about 5 weight percent of an intended addition of chromium oxide, wherein said inorganic fiber exhibits a shrinkage of 5% or less and a compression recovery of greater than 10% after exposure to a temperature of 1400° C. for 24 hours.

2. The inorganic fiber of claim 1, wherein said inorganic fiber has an average diameter of 4 microns and greater.

3. The inorganic fiber of claim 1, wherein said inorganic fiber exhibits a shrinkage of 4% or less after exposure to a temperature of 1260° C. for 24 hours.

4. The inorganic fiber of claim 1, wherein said inorganic fiber exhibits a compression recovery of about 10 to about 55 percent after exposure to a temperature of 1260° C. for 24 hours.

5. The inorganic fiber of claim 1, wherein said inorganic fiber comprises the fiberization product of about 70 to about 80 weight percent silica, about 15 to about 25 weight percent magnesia, greater than 0 to about 5 weight percent chromium oxide, and greater than 0 to about 4 weight percent alumina.

6. The inorganic fiber of claim 5, wherein said inorganic fiber comprises the fiberization product of about 70 to about 80 weight percent silica, about 15 to about 25 weight percent magnesia, greater than 0 to about 5 weight percent chromium oxide, greater than 0 to about 4 weight percent alumina, and 1 weight percent or less calcia.

7. The inorganic fiber of claim 6, wherein said inorganic fiber comprises the fiberization product of about 70 to about 80 weight percent silica, about 15 to about 25 weight percent magnesia, greater than 0 to about 5 weight percent chromium oxide, greater than 0 to about 4 weight percent alumina, and substantially free of alkali metal oxides.

8. The inorganic fiber of claim 1, wherein said inorganic fiber comprises the fiberization product of about 72 to about 80 weight percent silica, about 17 to about 22 weight percent magnesia, greater than 0 to about 5 weight percent chromium oxide, and greater than 0 to about 4 weight percent alumina.

9. The inorganic fiber of claim 8, wherein said inorganic fiber comprises the fiberization product of about 72 to about 80 weight percent silica, about 17 to about 22 weight percent magnesia, greater than 0 to about 5 weight percent chromium oxide, greater than 0 to about 4 weight percent alumina, and 1 weight percent or less calcia.

10. The inorganic fiber of claim 9, wherein said inorganic fiber comprises the fiberization product of about 72 to about 80 weight percent silica, about 17 to about 22 weight percent magnesia, greater than 0 to about 5 weight percent chromium oxide, greater than 0 to about 4 weight percent alumina, and substantially free of alkali metal oxide.

11. The inorganic fiber of claim 1, wherein said present inorganic fiber comprises the fiberization product of about 70 to about 80 weight percent silica, about 15 to about 25 weight percent magnesia, greater than 0 to about 5 weight percent chromium oxide, and greater than 0 to about 2 weight percent alumina.

12. The inorganic fiber of claim 1, wherein said inorganic fiber comprises the fiberization product of about 72 to about 86 weight percent silica, about 12.5 to about 26.5 weight percent magnesia, greater than 0 to about 5 weight percent chromium oxide, and 0 to about 4 weight percent alumina.

13. The inorganic fiber of claim 12, wherein said inorganic fiber comprises the fiberization product of about 72 to about 86 weight percent silica, about 12.5 to about 26.5 weight percent magnesia, greater than 0 to about 5 weight percent chromium oxide, greater than 0 to about 4 weight percent alumina and 1 percent or less of calcia.

14. The inorganic fiber of claim 1, wherein said inorganic fiber comprises the fiberization product of about 75 to about 79 weight percent silica, about 15 to about 20 weight percent magnesia, greater than 0 to about 5 weight percent chromium oxide, and greater than 0 to about 4 weight percent alumina.

15. The inorganic fiber of claim 14, wherein said inorganic fiber comprises the fiberization product of about 75 to about 79 weight percent silica, about 15 to about 20 weight percent magnesia, greater than 0 to about 5 weight percent chromium oxide, greater than 0 to about 4 weight percent alumina, and 1 weight percent or less calcia.

16. The inorganic fiber of claim 1, wherein said fiberization product contains greater than 0 to about 4 weight percent chromium oxide.

17. The inorganic fiber of claim 1, wherein said fiberization product contains greater than 0 to about 3 weight percent chromium oxide.

18. The inorganic fiber of claim 1, wherein said fiberization product contains greater than 0 to about 2 weight percent chromium oxide.

19. The inorganic fiber of claim 1, wherein said fiberization product contains greater than 0 to about 1 weight percent chromium oxide.

20. The inorganic fiber of claim 1, wherein said fiberization product contains about 0.125 to about 1 weight percent chromium oxide.

21. The inorganic fiber of claim 1, wherein said fiberization product contains about 0.25 to about 1 weight percent chromium oxide.

22. The inorganic fiber of claim 1, wherein said fiberization product contains about 0.3 to about 1 weight percent chromium oxide.

23. The inorganic fiber of claim 1, wherein said fiberization product contains about 0.4 to about 1 weight percent chromium oxide.

24. The inorganic fiber of claim 1, wherein said fiberization product contains about 0.5 to about 1 weight percent chromium oxide.

25. The inorganic fiber of claim 1, wherein said fiberization product contains about 0.6 to about 1 weight percent chromium oxide.

26. The inorganic fiber of claim 1, wherein said fiberization product contains about 0.75 to about 1 weight percent chromium oxide.

27. The inorganic fiber of claim 1, wherein said fiberization product contains about 0.8 to about 1 weight percent chromium oxide.

28. The inorganic fiber of claim 1, wherein said fiberization product contains about 1 to about 2 weight percent chromium oxide.

29. The inorganic fiber of claim 1, wherein said fiberization product contains about 1 to about 1.75 weight percent chromium oxide.

30. The inorganic fiber of claim 1, wherein said fiberization product contains about 1 to about 1.5 weight percent chromium oxide.

31. The inorganic fiber of claim 1, wherein said fiberization product contains about 1 to about 1.75 weight percent chromium oxide.

32. An inorganic fiber containing article comprising at least one of bulk fiber, blankets, needled blankets, needled mats, needled papers, papers, felts, cast shapes, vacuum cast forms, or compositions, said fiber containing article comprising the fiberization product of claim 1.

33. An inorganic fiber comprising the fiberization product of about 65 to about 86 weight percent silica, about 14 to about 35 weight percent magnesia, greater than 0 to about 5 weight percent chromium oxide, and greater than 0 to about 4 weight percent alumina, wherein the fiber has an average fiber diameter of 4 microns and greater, and wherein said inorganic fiber exhibits a shrinkage of 5% or less and a compression greater than 10% after exposure to a temperature of 1400° C. for 24 hours, and a shrinkage of 5% or less and a compression recovery from about 10 to about 55% after exposure to a temperature of 1260° C. for 24 hours.

* * * * *